United States Patent [19]

Baugh et al.

[11] Patent Number: 4,478,292

[45] Date of Patent: Oct. 23, 1984

[54] PIPE GRIPPING APPARATUS WITH INTERLOCKING PLATES

[75] Inventors: Benton F. Baugh, Houston, Tex.; Gerard J-M. Lux, Ifs; Jean-Paul Ribeyre, Vert Saint Denis, both of France

[73] Assignee: Schlumberger Technology Corporation, New York, N.Y.

[21] Appl. No.: 399,421

[22] Filed: Jul. 19, 1982

[51] Int. Cl.³ .................. B23Q 5/027; B23Q 5/033
[52] U.S. Cl. .................... 173/149; 173/159; 254/29 R
[58] Field of Search ...... 24/263 D, 263 DT, 263 CA, 24/263 A, 263 DA, 263 SW, 249 DP; 173/149, 159; 254/29 R

[56] References Cited

U.S. PATENT DOCUMENTS

| 1,234,041 | 7/1917 | Knapp | 24/263 DT |
|---|---|---|---|
| 1,455,142 | 5/1923 | Loyd | 24/263 DT |
| 1,560,701 | 11/1925 | Layton | 24/263 DT |
| 1,693,478 | 11/1928 | Davis | 24/263 CA |
| 1,908,421 | 5/1933 | Heggem | 24/249 DP |
| 2,290,799 | 7/1942 | Brauer | 24/263 DT |
| 2,431,165 | 11/1947 | Buckingham | 24/263 DT |
| 3,096,075 | 7/1963 | Brown | 254/29 R |
| 3,531,836 | 10/1970 | Crickmer | 24/263 DT |
| 3,722,603 | 3/1973 | Brown | 173/159 |
| 4,269,277 | 5/1981 | Baugh | 24/263 DT |

Primary Examiner—Victor N. Sakran

[57] ABSTRACT

In accordance with an illustrative embodiment of the present invention, the individual slip members of a pipe handling apparatus are maintained in substantially the same horizontal plane by plate members attached to the top of the respective slip members, each of said plate members having projecting portions that overlap and engage the projecting portions of an adjacent plate member. The maintenance of the slip members in substantially the same horizontal plane assures uniform engagement of the teeth thereof with the outer wall of a pipe.

12 Claims, 5 Drawing Figures

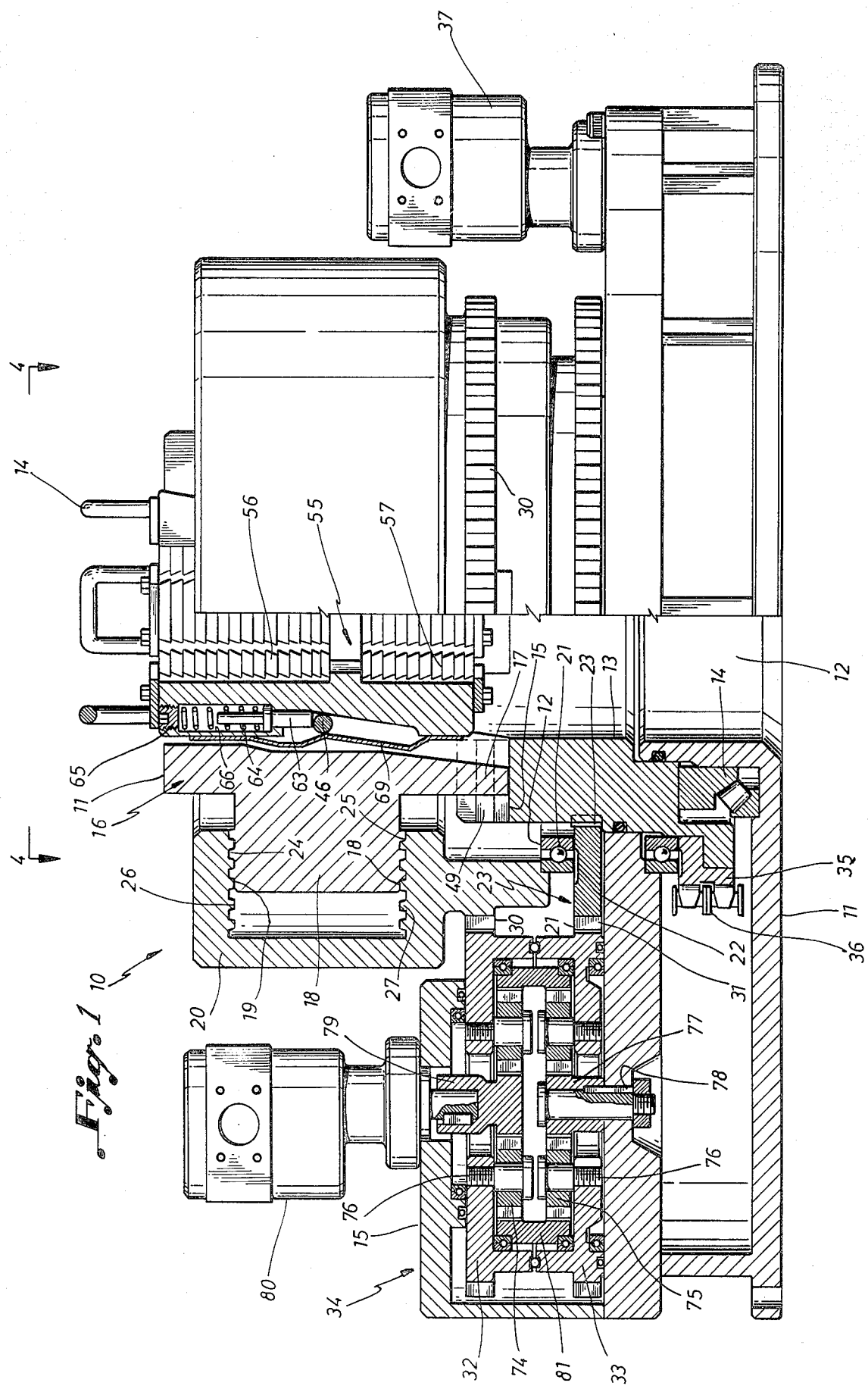

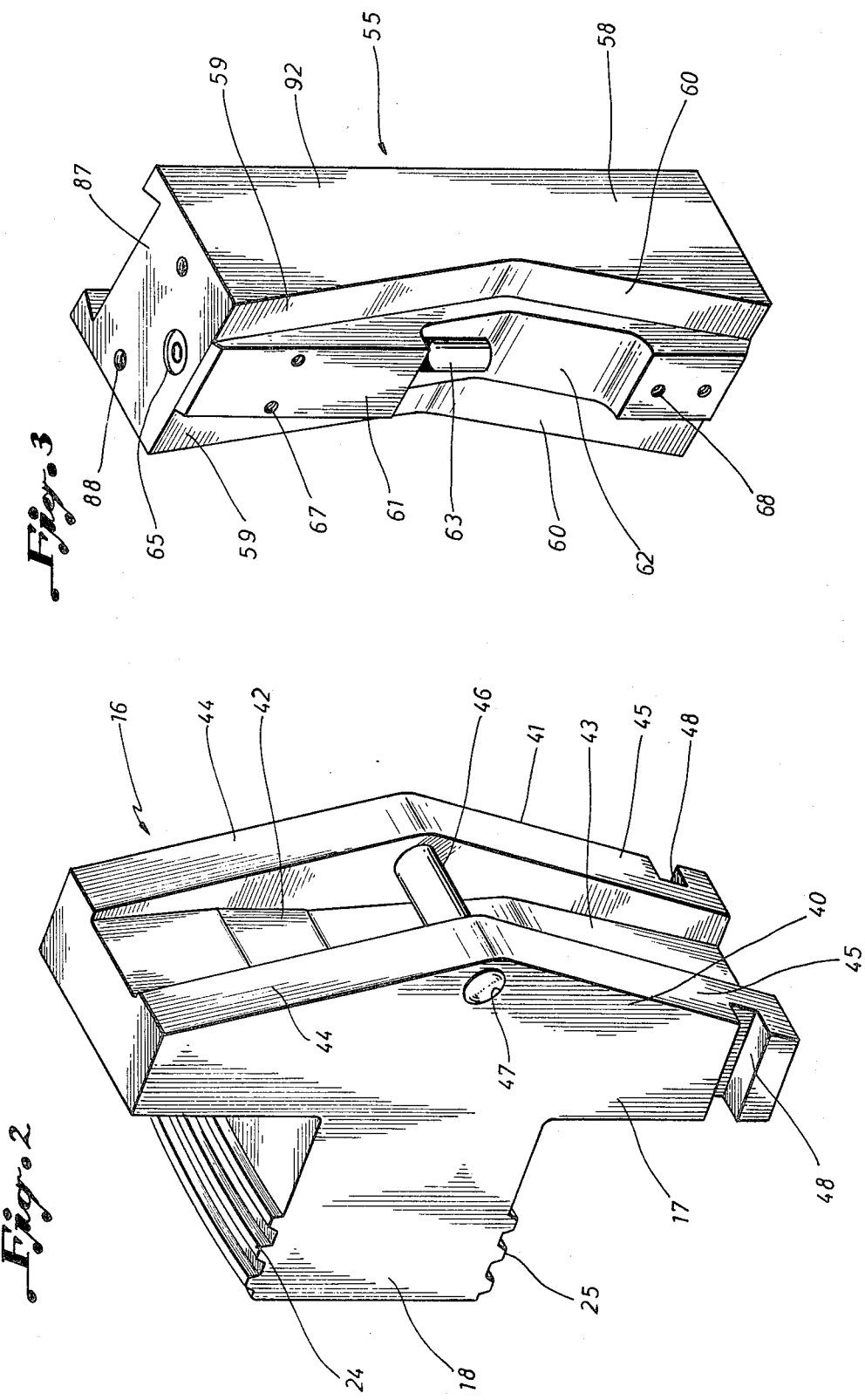

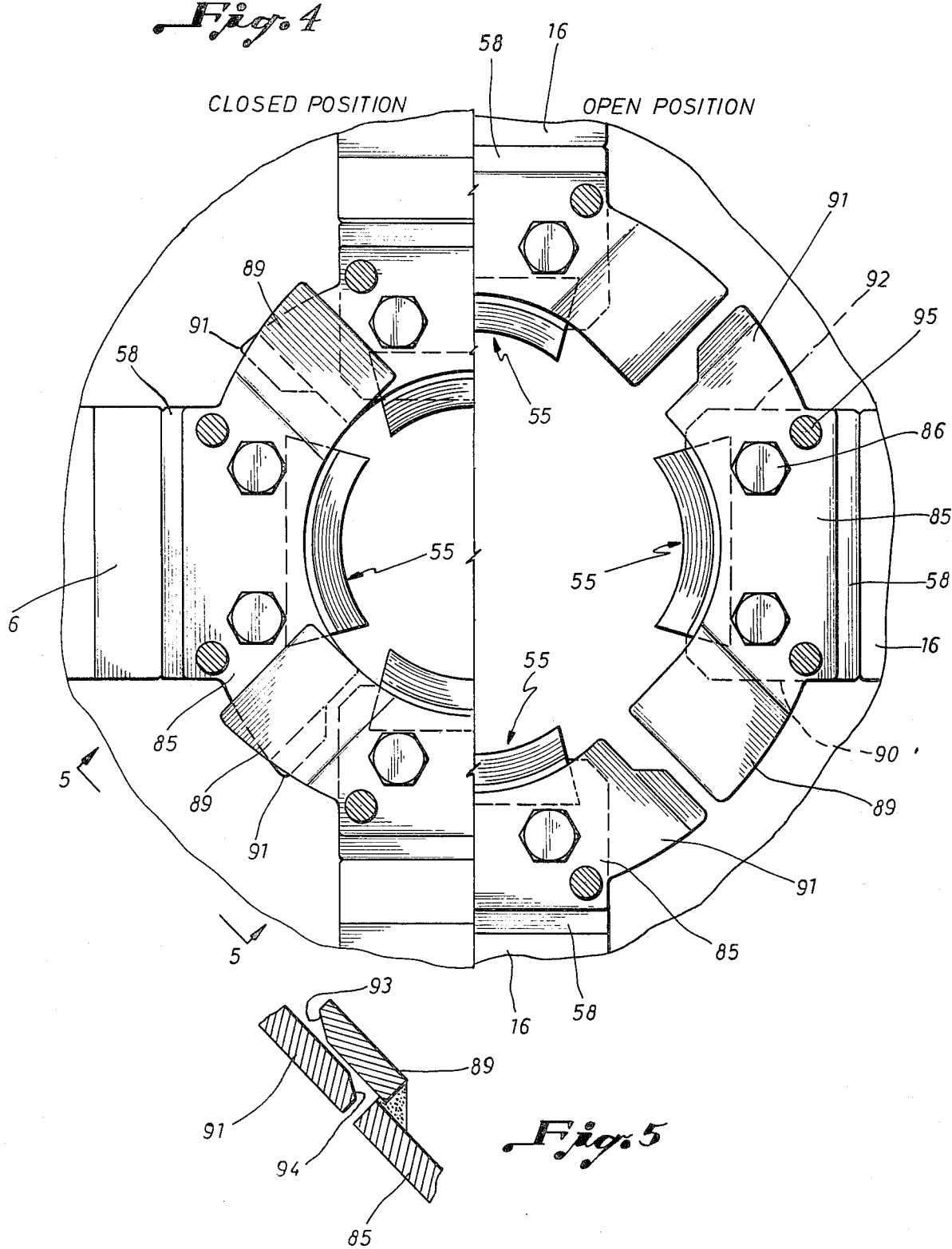

PIPE GRIPPING APPARATUS WITH INTERLOCKING PLATES

FIELD OF THE INVENTION

This invention relates to a pipe gripping apparatus useful in a pipe snubbing unit or the like, such apparatus including new and improved means for ensuring uniform engagement of a plurality of slip members with the outer surface of a pipe being inserted into or removed from a well.

BACKGROUND OF THE INVENTION

Pipe snubbing units typically have vertically spaced gripping heads mounted on a frame in a manner such that the lower head remains stationary while the upper head is raised and lowered through the action of hydraulic jacks or the like. The gripping heads each carry slip members that can be alternately engaged with and released from the pipe being run into or withdrawn from the well, and one of the heads may be constructed and arranged to cause rotation of the pipe.

As shown and described in U.S. Pat. No. 4,269,277, a gripping head may include a plurality of circumferentially spaced and radially shiftable carrier blocks on which slip members are mounted. The slip members normally are centered with respect to the carrier blocks by spring-loaded plungers that bear against transverse pins on the blocks. The carrier blocks and slip members are shifted inwardly until teeth on the inner surfaces of each slip member are brought into gripping contact with outer surfaces of the pipe. Each carrier block has upper and lower oppositely inclined wedge surfaces that are cooperable with companion wedge surfaces on a respective slip member in a manner such that either upward or downward relative movement of the pipe increases the gripping pressure. However should one of the slip members move vertically relative to the others during operation of the gripping unit, so that the slip members are not precisely in the same horizontal plane, the loading on the slip members will not be uniform which can result in a condition where the pipe can be damaged by crushing or the like.

It is the general object of the present invention to provide a new and improved pipe gripping unit of the type described.

Another object of the present invention is to provide a new and improved pipe gripping unit having means for ensuring uniform engagement of the teeth of each slip member with the outer surface of the pipe.

SUMMARY OF THE INVENTION

These and other objects are attained in accordance with the concepts of the present invention through the provision of pipe gripping apparatus comprising a plurality of pairs of opposed slip means movable radially between retracted and extended positions with respect to a tubular member that is to be engaged thereby. Each slip means has teeth on its inner periphery which in the extended position bite into and grip the tubular member. In order to assure uniform engagement of all of the teeth of each slip means with the tubular member, the slip members are coupled together so as to remain in substantially the same horizontal plane during inward and outward movement. In a preferred embodiment, such coupling is attained by a generally arcuate plate attached to the upper end of each slip member, with each plate having portions projecting beyond the sides of the slip member, and overlapping with projecting portions of adjacent plates. Thus arranged, the slip members are maintained in substantially the same horizontal plane with vertical movement of any one slip member relative to the others being precluded by engagement of opposing surfaces of the projecting portions of the plates. The circumferential dimensions of the plates are sized and arranged such that in the fully retracted positions of the slip members the projecting portions of the plates do not overlap, thereby enabling removal of an individual slip member from the assembly.

BRIEF DESCRIPTION OF THE DRAWINGS

The present invention has other objects, features and advantages that will become more clearly apparent from the following detailed description of a preferred embodiment, taken in conjunction with the appended drawings in which:

FIG. 1 is a side view of a powered slip assembly that incorporates the present invention, with some portions of the assembly being shown in section and others in elevation;

FIG. 2 is an isometric view of a slip carrier block included in the assembly of FIG. 1;

FIG. 3 is a view similar to FIG. 2 showing a slip member that is mounted on the carrier block;

FIG. 4 is a top view illustrating the interlocking plate assembly of the present invention, the right-hand side showing the slips retracted and the left-hand side showing the slips extended; and FIG. 5 is a fragmentary view taken along lines 5—5 of FIG. 4.

DESCRIPTION OF A PREFERRED EMBODIMENT

Referring initially to FIG. 1, a powered slip assembly indicated generally at 10 includes a base 11 that is adapted to be mounted on the frame of a snubbing unit. The base 11 has a central opening 12 for receiving a joint of tubing or other well pipe that is being run into, or removed from, a well. A mandrel 13 is mounted by a bearing 14 for rotation with respect to the base 11, and has a plurality of circumferentially spaced, radially extending T-slots 15 formed in the upper end thereof. The mandrel 13 has a plurality of slip carriers 16 mounted at its upper end, with each carrier having a lower section 17 with channels that mate with the T-slots 15 to provide a radially slidable connection. The rear portion 18 of each carrier 16 extends into the internal annular recess 19 of an annular bowl 20 that has a central opening in axial alignment with the opening 12 in the base 11. The bowl 20 is mounted by a bearing 21 for rotation with respect to the mandrel 13, the bearing 21 resting on a ring gear 22 that is connected by splines 23 or the like to mandrel.

The rear portion 18 of each slip carrier 16 has upper and lower threads 24, 25 that are engaged by companion threads 26, 27 that extend around the respective upper and lower walls of the recess 19. Thus arranged, it will be appreciated that rotation of the bowl 20 relative to the mandrel 13 in one direction will cause the slip carriers 18 to be advanced radially inward toward the vertical center line of the opening 12, whereas relative rotation of the bowl 20 in the opposite direction will cause the carriers 16 to be moved radially outward. The bowl 20 has a set of gear teeth 30 formed on the lower outer portion thereof by which the bowl can be rotated. The teeth 30 and the teeth 31 on the ring gear 22 are formed on the same diameter and are in mesh with the teeth of upper and lower gears 32, 33 of a drive mechanism, indicated generally at 34, to be described below. A sprocket 35 encircles and is secured to the lower portion of the mandrel 13, and is engaged by a chain 36 which is driven by the output gear of a reversible hydraulic motor 37 which is mounted to the upper side of the base 11 in an appropriate manner.

As shown in further detail in FIGS. 2 and 3, the body of each slip carrier 16 has spaced-apart side walls 40 and 41 extending outwardly of its inner face 42 to define a vertically extending recess 43. The outer faces 44 of the upper portions of the walls 40 and 41 slope upwardly and outwardly, whereas the lower faces 45 slope downwardly and outwardly. A rod 46 having its opposite ends fitted in aligned apertures 47 in the walls 40 and 41 extends across the recess 43. Grooves 48 formed in the lower sides of the body are arranged to mate with flanges 49 extending inwardly on each side of the T-slots 15 in the upper end of the mandrel 13 to provide a sliding connection for each carrier 16 as it moves inwardly and outwardly.

A slip assembly indicated generally at 55 is mounted on each carrier 16 and has upwardly facing teeth 56 and downwardly facing teeth 57 on its inner face as shown in FIG. 1. The teeth 56, 57 are arranged to bite into and grip the outer periphery of a pipe that is disposed in the opening 12 when the slip assemblies are moved inwardly into engagement therewith. As described in detail in U.S. Pat. No. 4,269,277 issued May 26, 1981 and incorporated herein by reference, each slip assembly 55 includes a generally rectangular block 58 as shown in FIG. 3 having surfaces 59 and 60 to either side of the rear thereof which slope in opposite directions and have complimentary inclinations to the surfaces 44 and 45 on the carrier 16. A rib 61 on the rear of each block 58 has a recessed central portion 62 into which projects a centering pin 63. The pin 63 is biased downwardly by a coil spring 64 as shown in FIG. 1, with the compression of the spring being set through adjustment of a threaded screw 65 at the upper end of the bore 66 which houses the spring and the upper end portion of the pin. When the parts are assembled the bottom surface of the pin 63 rests upon the cross rod 46, and functions to center the block 58 vertically with respect to the carrier 16. However it will be apparent that the block 58 can shift downwardly to some extent relative to the carrier 16 as permitted by compression of the spring 64, and that the inclined surfaces 59 and 44 will coact to cause the block to be shifted inwardly to some extent. The block 58 also can move upwardly and be shifted inwardly by the coaction of the inclined surfaces 60 and 45. Taps 67 and 68 are provided on the upper and lower rear faces of the rib 61 so that a cover plate 69 can be attached which retains the slip assembly 55 and the carrier 16 together as a unit.

Referring again to FIG. 1, the drive mechanism 34 by which the slip assemblies 55 and the carriers 16 can be moved inwardly and outwardly with respect to the bowl 20 will be described. The drive mechanism 34 includes upper and lower spur gears 32 and 33 having teeth that mesh with the teeth on the gears 30 and 22 on the bowl 20 and the mandrel 13, respectively. Each of the gears 32 and 33 carries several planetary gears 74, 75 that are mounted on suitable axles 76. A gear 77 is held stationary by a key 78. Another gear 79 that is mounted on the output shaft of a typical reversible hydraulic motor 80 provides power input to the transmission. A ring gear 81 is engaged only by the planetary gears 74, 75. Suitable bearings and seals are provided as shown to allow the gearing to operate in a protected environment with low friction The drive mechanism 34 operates generally as follows. If motor 37 is operated, the rotating mandrel 13 is driven in rotation by the chain 36 and the sprocket 35. This also jointly rotates the slip carriers 16 via the T-slot couplings 15. Such rotation normally is required when the slip assemblies 55 are against the pipe, and thus the bowl 20 naturally is urged to rotate also. When motor 37 is stopped it is hydraulically locked and therefore prevents the rotating mandrel 13 and the carrier and slip assemblies 16 and 55 from rotating. If motor 80 is operated, the ring gear 32 is caused to rotate because the ring gear 33 is locked in place due to its connections to the motor 37. Rotation of the gear 32 causes the bowl 20 to rotate and the carriers 16 to be moved radially toward or away from the pipe, depending upon the direction of operation of the motor 80.

Turning now to FIGS. 4 and 5 for a detailed illustration of the interlocking plate assembly of the present invention, each of the slip blocks 58 has a generally arcuately-shaped plate member 85 fixed to its upper end surface 87 by studs 86 that are threaded into taps 88 (FIG. 3). Each of the plate members 85 has a portion 89 that extends or projects beyond the adjacent side wall 90 of its associated slip block 58, and an oppositely disposed portion 91 that extends or projects beyond the opposite side wall 92 of the slip block. The projecting portion 89 is vertically spaced by an amount approximately equal to the thickness of the other projecting portion 91 of the plate member, and may be formed by a separate element which is welded to the central part of the plate member as shown in FIG. 5. As the respective slip assemblies are shifted inwardly from the positions shown on the right-hand side of FIG. 4 to the positions shown on the left-hand side of the drawing figure, the projecting portions 89, 91 are moved into overlapping relation with the opposed projecting portions of adjacent plate members shown. In a preferred embodiment, the respective projecting portions have oppositely inclined surfaces 93, 94 which function to guide the portions into the overlapping positions shown in FIG. 5 in the event that the slip assemblies initially are not in the same horizontal plane. As shown on the right-hand side of FIG. 4, the plates are dimensioned such that there is a transverse clearance between the adjacent end surfaces of the portions 89 and 91 when the slip assemblies are fully retracted. This enables one slip assembly to be removed from the combination without having to disturb any of the other slip assemblies. Handles 95 are secured to the upper surface of each plate member 85 for convenience in removal.

OPERATION

In operation, the powered slip assembly 10 constructed and arranged as shown in the drawings is mounted on the frame of a snubbing unit. Hydraulic lines connected to the motors 37 and 80 lead to a control station where the operator can manipulate appropriate valves in order to actuate the slip assembly 10. In order to cause the slips 55 to grip a tubular joint of pipe that has been extended through the passage 12, the motor 80 is operated in the appropriate direction. The annular gear 81 is locked in place by the lower planetary gears 75, the lower ring gear 33 and the gear 22 which cannot rotate unless the motor 37 is powered. Thus rotation of the upper planetary gears 74 causes their axles 76 to revolve and thereby drive the upper spur gear 32. The resulting rotation of the bowl 20 relative to the stationary mandrel 13 causes the threads 26, 27 to drive the slip carriers 16 radially inward until the teeth 56, 57 on the slip assemblies 55 come into gripping engagement with the outer periphery of the pipe. Once the teeth are engaged, upward or downward forces that are applied to the pipe by the slip assemblies result in a tightening of their gripping engagement therewith due to the cooperation of the inclined surfaces 44, 45 and 59, 60 on the slip carrier bodies and the slip blocks 58. The direction of operation of the motor 80 is reversed to cause the slip carriers and slip assemblies to be shifted radially outward and out of engagement with the pipe.

In order to rotate the pipe, the motor 37 is powered to cause the chain 36 to drive the sprocket 35 and thus the rotating mandrel 13. Since the slip carriers 16 are connected at their lower ends to the mandrel 13, the carriers and the slip assemblies 55 are driven to cause the pipe to rotate. The bowl 20 also will rotate, as will the upper and lower spur gears 32 and 33 of the transmission 34. Of course, the pipe can be rotated in either direction, depending upon the direction of operation of the motor 37.

As the slip assemblies 55 are shifted radially inwardly from the retracted positions shown on the right-hand side of FIG. 4 to the extended positions shown on the left-hand side thereof, the adjacent side projections 89 and 91 of the plate members 85 are brought into overlapping relationship as shown in FIG. 5. In the overlapped position, vertical movement of any one slip assembly relative to the others is blocked by engagement of the opposed top and bottom surfaces of the respective side projections, so that the slip assemblies 55 are retained in substantially the same horizontal plane. Thus uniform engagement of the teeth of all of the slip assemblies with the exterior of the pipe is assured.

Since certain changes or modifications may be made in the disclosed embodiment without departing from the inventive concepts involved, it is the aim of the appended claims to cover all such changes and modifications falling within the true spirit and scope of the present invention.

What is claimed is:

1. In a pipe handling apparatus having a body with a central opening arranged to receive a tubular member and including a plurality of toothed circumferentially spaced slip assemblies movable between outer positions disengaged from the tubular member and inner positions engaged therewith, the improvement comprising a plurality of interlocking plate members respectively secured to the slip assemblies and cooperable when said slip assemblies are moved to said inner positions to interlock with adjacent plate members to prevent relative vertical movement between slip assemblies so as to assure uniform engagement of the teeth on said slip assemblies with the tubular member.

2. The apparatus of claim 1 wherein each plate member is generally arcuately-shaped and is secured to an end surface of a respective slip assembly, said plate member having opposite end portions extending beyond the respective side walls of said slip assembly, each of said end portions being formed for overlapping with the adjacent end portion of an adjacent plate member when said slip assemblies are moved to said inner positions to prevent vertical movement of said slip assemblies relative to each other.

3. The apparatus of claim 2 wherein one of said end portions is vertically spaced with respect to the other of said end portions by an amount approximately equal to the thickness of said plate member.

4. The apparatus of claim 3 wherein said one end portion has a downwardly facing inclined surface on the outer end thereof, and said other end portion has an upwardly facing inclined surface on the outer end thereof, said surfaces cooperating as said slip assemblies are moved inwardly from said outer positions to guide said end portions into overlapping relationship.

5. The apparatus of claim 4 wherein the circumferential dimensions of each of said plate members is sized to provide clearance between said end portions when said slip assemblies are in said outer positions to enable vertical movement of one slip assembly relative to the others.

6. Apparatus for handling tubular members being inserted into or removed from a well, comprising: body means having a central opening arranged to receive a tubular member; a plurality of circumferentially-spaced carrier means on said body means, each of said carrier means being arranged for radial movement with respect to the longitudinal axis of said opening between outer and inner positions; means for moving said carrier means jointly between said outer and inner positions; a plurality of slip assemblies respectively mounted on each of said carrier means and arranged for limited vertical movement with respect thereto, each slip assembly having teeth arranged to engage and grip the tubular member when said slip assemblies and carrier means are in said inner positions; and a plurality of interlocking plate members respectively secured to the slip assemblies and cooperable when said slip assemblies and carrier means are moved to said inner positions to prevent relative vertical movement between slip assemblies so as to assure uniform engagement of said teeth with the tubular member.

7. The apparatus of claim 6 wherein each of said plate members has oppositely extending end portions projecting beyond the side walls of the slip assembly to which it is attached, said end portions being arranged to overlap with and engage the end portions of adjacent plate members when said slip assemblies and carrier means are moved to said inner positions to thereby prevent vertical movement of any one of said slip assemblies relative to the others.

8. The apparatus of claim 7 wherein one of said end portions of each plate member is spaced vertically with respect to the other of said end portions therof by an amount approximately equal to the thickness of said plate member.

9. The apparatus of claim 8 wherein said opposite end portions each have inclined surfaces on the ends thereof adapted to guide adjacent end portions of said plate members into overlapping relationship as said slip assemblies and carrier means are moved from said outer positions toward said inner positions.

10. The apparatus of claim 9 wherein the circumferential dimensions of each of said plate members is sized to provide lateral clearance between said end portions when said slip assemblies and carrier means are in said outer positions to enable removal of any one of said slip assemblies from said apparatus.

11. The apparatus of claim 6 further including inclined surface means on each of said slip assemblies and carrier means for increasing the pressure of gripping engagement with said tubular member in response to vertical movement of said slip assemblies relative to said carrier means in either vertical direction.

12. The apparatus of claim 6 wherein said slip assemblies and carrier means are arranged in oppositely disposed pairs that are moveable radially toward and away from one another.

* * * * *